(12) United States Patent
Raza et al.

(10) Patent No.: US 12,269,023 B2
(45) Date of Patent: Apr. 8, 2025

(54) THERMOCHEMICAL ENGINE

(71) Applicant: KING FAHD UNIVERSITY OF PETROLEUM AND MINERALS, Dhahran (SA)

(72) Inventors: Arshad Raza, Dhahran (SA); Guenther Glatz, Dhahran (SA); Mohamed Mahmoud, Dhahran (SA); Mobeen Murtaza, Dhahran (SA); Alade Olalekan Saheed, Dhahran (SA); Esmail Mohamed Ali Mokheimer, Dhahran (SA); Muhammad Shahzad Kamal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/815,212

(22) Filed: Aug. 26, 2024

(65) Prior Publication Data

US 2025/0065286 A1    Feb. 27, 2025

Related U.S. Application Data

(60) Provisional application No. 63/578,807, filed on Aug. 25, 2023.

(51) Int. Cl.
*B01J 7/02*    (2006.01)
*F03G 7/00*    (2006.01)

(52) U.S. Cl.
CPC ............... *B01J 7/02* (2013.01); *F03G 7/008* (2021.08)

(58) Field of Classification Search
CPC ........................................................ B01J 7/02
See application file for complete search history.

(56) References Cited

U.S. PATENT DOCUMENTS 5,183,581 A    2/1993    Khalil et al.
7,347,049 B2 *    3/2008    Rajendran ............. F01K 25/065
                                                                  60/676

(Continued)

FOREIGN PATENT DOCUMENTS

CN            1076758 A      9/1993
DE    10 2007 006 512 B4    7/2016
WO        2023/079313 A1    5/2023

OTHER PUBLICATIONS

"Thermally Activated Nitrogen/Heat Generating Reaction: A Klinetic Study" Al-Taq et al. (Year: 2023).*

(Continued)

*Primary Examiner* — Thomas E Lazo
(74) *Attorney, Agent, or Firm* — Oblon, McClelland, Maier & Neustadt, L.L.P.

(57) ABSTRACT

A thermochemical engine that includes a reaction chamber having a nitrite source inlet, an ammonium source inlet, and a gas outlet, and a gas-driven energy transducer coupled to the reaction chamber such that a gas produced in the reaction chamber moves the gas-driven energy transducer in a process of exiting the reaction chamber via the gas outlet. The thermochemical engine is configured to produce the gas under pressure by reacting in the reaction chamber a nitrite source comprising a nitrite ion and an ammonium source comprising an ammonium ion in the presence of water at a reaction temperature of 50 to 150° C.

15 Claims, 5 Drawing Sheets

(56) References Cited

U.S. PATENT DOCUMENTS

| | | | | |
|---|---|---|---|---|
| 2009/0304558 | A1* | 12/2009 | Patton | C01B 3/065 |
| | | | | 422/600 |
| 2014/0249339 | A1* | 9/2014 | Simanzhenkov | B01J 19/245 |
| | | | | 422/162 |
| 2023/0272981 | A1* | 8/2023 | Jacobsson | F28D 20/003 |
| | | | | 165/10 |

OTHER PUBLICATIONS

"Kinetics and mechanism of reaction between ammonium and nitrite ions: experimental and theoretical studies" Nguyen et al. (Year: 2003).*

Duc A. Nguyen et al.; "Fused Chemical Reactions, 2. Encapsulation: Application to Remediation of Paraffin Plugged Pipelines", Ind. Eng. Chem. Res., vol. 40. Issue 23. Apr. 26, 2001, pp. 5058-6065, 2 pages.

Duc A. Nguyen et al.: "Kinetics and mechanism of the reaction between ammonium and nitrite ions: experimental and theoretical studies", Chemical Engineering Science, vol. 58, Issue 19, Oct. 2003, pp. 4351-4362, 3 pages.

Fahad Khan et al. "Application of Thermochemical Fluids as a Sustainable Energy Source in Steam Engine", International Petroleum Technology Conference, IPTC 2024, Feb. 12-14, 2024, 9 pages.

K. Maniatis et al., "Conclusions of the Workshop 'Applications for Thermochemical Processes", A.V. Bridgwater et al. (eds.), Developments in Thennochemical Biomass Conversion, Springer Science+ Business Media Dordrecht 1997, pp. 1631-1632.

Wenich Vattanapuripakorn et al.. "Advanced Power Generation Using a Nitrogen Turbine Engine Instead of a Conventional Injection Steam Turbine Engine," Inventions 2021, vol. 6, No. 4, 17 pages.

Carlos Alexandre Lutterbeck et al., "Environmental and economic impacts associated with the use of boilers of a steam generator system et a tobacco manufacturing industry", Environmental Challenges, vol. 5 (2021) Oct. 3, 2023, Oct. 16, 2021 (11 pages).

Cheng Qian et al.. "A novel in situ N2 generation system assisted by authigenic acid for formation energy enhancement in an oilfield," RSC Advances, vol. 9 (2019), pp. 39914-38923.

Olalekan S. Alade et al., "Novel Approach for Improving the Flow of Waxy Crude Oil Using Thermochemical Fluids: Experimental and Simulation Study," ACS Omega, vol. 5 (2020), pp. 4313-4321.

K. Al-Khori et al., "Techno-economic and environmental assessment of integrating SOFC with a conventional steam and power system in a natural gas processing plant." International Journal of Hydrogen Energy. vol. 44, No. 56, pp. 29604-29617, 10 pages.

* cited by examiner

THERMOCHEMICAL ENGINE

CROSS-REFERENCE TO RELATED APPLICATION

This application claims the benefit of priority of U.S. Provisional Application No. 63/578,807 filed on Aug. 25, 2023, the entire contents of which are herein incorporated by reference.

BACKGROUND OF THE INVENTION

Field of the Invention

The present disclosure relates to a thermochemical engine and a method of providing kinetic energy to an object using the thermochemical engine.

Discussion of the Background

Conventional engines use combustion of a fuel to generate heat and power, typically in the form of rapidly expanding gas. Combustion, however, is associated with disadvantageous properties, such as low efficiency, harmful byproducts such as gaseous pollutants or greenhouse gases, and consumption of non-renewable resources. Using a fused chemical reaction has the possibility of producing non-toxic gases and using more environmentally friendly resources. Fused chemical reactions may prove advantageous over combustion.

Fused chemical reactions are reactions which can be delayed from taking place by either physical or chemical means. In addition, these reactions generate heat and power to utilize for various applications related to pharmaceutical, fertilizer, agriculture, and oil industry. One promising application of fused chemical reactions is the possibility to harness the energy produced by these reactions. However, the kinetics and mechanisms of fused reaction along with the reaction rate parameters, such as pH, concentration of reactants, and temperature, are critical to the application of these reactions in energy-generating or energy-harnessing applications.

Accordingly, it is an objective of the present disclosure to provide a thermochemical engine that does not produce power by combustion but instead uses a thermochemical reaction capable of producing a gas.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

SUMMARY OF THE INVENTION

The present disclosure relates to a method of providing kinetic energy to an object, the method comprising coupling the object to the gas-driven energy transducer of a thermochemical engine that includes a reaction chamber comprising a nitrite source inlet, an ammonium source inlet, and a gas outlet, and a gas-driven energy transducer coupled to the reaction chamber such that a gas produced in the reaction chamber moves the gas-driven energy transducer in a process of exiting the reaction chamber via the gas outlet, providing to the reaction chamber a nitrite source comprising a nitrite ion and an ammonium source comprising an ammonium ion in the presence of water at a reaction temperature of 50 to 150° C., wherein the nitrite ion and the ammonium ion undergo a chemical reaction to produce a gas and heat which drive the gas-driven energy transducer.

In some embodiments, the nitrite source comprises an alkali metal nitrite.

In some embodiments, the alkali metal nitrite is sodium nitrite.

In some embodiments, the ammonium source comprises an ammonium halide.

In some embodiments, the ammonium halide is ammonium chloride.

In some embodiments, the ammonium source comprises ammonium sulfate.

In some embodiments, the nitrite source is provided to the reaction chamber in form of an aqueous solution having a concentration of 0.25 to 5 M of nitrite ion.

In some embodiments, the ammonium source is provided to the reaction chamber in form of an aqueous solution having a concentration of 0.25 to 5 M of ammonium ion.

In some embodiments, the nitrite source and ammonium source are provided in amounts to give a ratio of nitrite ion to ammonium ion in the reaction chamber of 0.75:1 to 1:0.75.

In some embodiments, the nitrite source and the ammonium source are each provided as an aerosol.

In some embodiments, the nitrite source and the ammonium source are each provided as a liquid.

In some embodiments, the method produces 150,000 to 1,250,000 psi*mL per mole of nitrite ion reacted.

In some embodiments, the nitrite source and ammonium source are each provided at a rate of 0.25 to 2.5 mol/min.

In some embodiments, the chemical reaction between the nitrite ion and the ammonium ion reaches 70 to 90% completion in 10 to 15 minutes.

In some embodiments, the method further comprises rinsing the reaction chamber by providing to the reaction chamber a wash fluid.

In some embodiments, the wash fluid is water.

The present disclosure also relates to a thermochemical engine, comprising a reaction chamber comprising a nitrite source inlet, an ammonium source inlet, and a gas outlet, and a gas-driven energy transducer coupled to the reaction chamber such that a gas produced in the reaction chamber moves the gas-driven energy transducer in a process of exiting the reaction chamber via the gas outlet, wherein the thermochemical engine is configured to produce the gas under pressure by reacting in the reaction chamber a nitrite source comprising a nitrite ion and an ammonium source comprising an ammonium ion in the presence of water at a reaction temperature of 50 to 150° C.

In some embodiments, the gas-driven energy transducer is at least one selected from the group consisting of a piston configured to create a gas-tight seal with an interior surface of the reaction chamber and a turbine configured to be turned by the gas as the gas exits the reaction chamber via the gas outlet.

In some embodiments, the thermochemical engine further comprises a liquid outlet.

In some embodiments, the thermochemical engine further comprises at least one selected from the group consisting of a vapor-liquid separator connected to the gas outlet configured to prevent separate the gas from a liquid/gas mixture which enters the gas outlet from the reaction chamber and a hydrophobic element configured to prevent water from exiting via the gas outlet.

DETAILED DESCRIPTION OF THE INVENTION

In the following description, it is understood that other embodiments may be utilized and structural and operational changes may be made without departure from the scope of the present embodiments disclosed herein.

Definitions

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

Furthermore, the terms "approximately", "approximate", "about", and similar terms generally refer to ranges that include the identified value within a margin of 20%, 10%, or preferably 5%, and any values therebetween.

The use of the terms "include", "includes", "including," "have," "has," or "having" should be generally understood as open-ended and non-limiting unless specifically stated otherwise.

The term "aerosol" refers to a fluid colloidal system of two or more components in which the dispersed phase is a solid, a liquid or a mixture of both and the continuous phase is a gas, typically air.

According to a first aspect, the present disclosure relates to a thermochemical engine. The thermochemical engine includes a reaction chamber that includes a nitrite source inlet, an ammonium source inlet, and a gas outlet.

The thermochemical engine also includes a gas-driven energy transducer coupled to the reaction chamber such that a gas produced in the reaction chamber moves the gas-driven energy transducer in a process of exiting the reaction chamber via the gas outlet.

The thermochemical engine is configured to produce the gas under pressure by reacting in the reaction chamber a nitrite source comprising a nitrite ion and an ammonium source comprising an ammonium ion. The gas produced by the reaction moves the gas-driven energy transducer.

In some embodiments, the gas-driven energy transducer is at least one selected from the group consisting of a piston and a turbine.

In some embodiments, the gas-driven energy transducer is a piston.

In an exemplary embodiment included for illustrative purposes, the reaction chamber can be a cylindrical chamber having the nitrite source inlet and ammonium source inlet disposed at a first end of the cylindrical chamber. At the second end of the cylindrical chamber, opposite the first end, the gas outlet can be disposed. The gas-driven energy transducer can be a piston configured to create a gas-tight seal with an interior surface of the reaction chamber (e.g., walls of the cylindrical chamber) and slide along a length of the cylindrical chamber such that a volume of the reaction chamber can be defined by the wall of the cylindrical chamber and a surface of the piston. During operation, the piston can start in a first position such that the reaction chamber includes the nitrite source inlet and ammonium source inlet and a relatively small volume but does not include the gas outlet. After introduction of the nitrite source and ammonium source and caused by a reaction therebetween, production and expansion of gas associated with the reaction can push the piston along the length of the cylindrical chamber until the piston reaches a second position at which the reaction chamber includes the gas outlet. At this point, gas can exit the reaction chamber.

In another exemplary embodiment, the reaction chamber can be a cylindrical chamber having the nitrite source inlet, ammonium source inlet, and gas outlet disposed at a first end of the cylindrical chamber. Each of the nitrite source inlet, ammonium source inlet, and gas outlet can be closed with a controllable valve. These valves can be independently controlled, for example, to allow for inlet of the nitrite source and/or ammonium source while preventing gas outlet and/or to allow for outlet of gas while preventing inlet of the nitrite source and/or ammonium source. During operation, the piston can start in a first position such that the reaction chamber includes has a relatively small volume. After introduction of the nitrite source and ammonium source and caused by a reaction therebetween, production and expansion of gas associated with the reaction can push the piston along the length of the cylindrical chamber until the piston reaches a second position at which the gas outlet (or a valve at the gas outlet) can open and the gas can exit the reaction chamber.

In general, the thermochemical engine can include similar features, design elements, construction, and/or operation as other types of engines which may be familiar to those of ordinary skill in the art which also include a piston as an energy transducer, such as piston-driven reciprocating internal combustion engines.

In some embodiments, the energy transducer is a turbine.

In an exemplary embodiment included for illustrative purposes, the reaction chamber can be a cylindrical chamber having the nitrite source inlet and ammonium source inlet disposed at a first end of the cylindrical chamber. At the second end of the cylindrical chamber, opposite the first end, the gas outlet can be disposed. The gas-driven energy transducer can be a turbine disposed within the cylindrical chamber between the first end and the second end and configured such that after introduction of the nitrite source and ammonium source and caused by a reaction therebetween, production and expansion of gas associated with the reaction can turn the turbine as the gas exits via the gas outlet.

In general, the thermochemical engine can include similar features, design elements, construction, and/or operation as other types of engines which may be familiar to those of ordinary skill in the art which also include a turbine as an energy transducer, such as a steam turbine, a gas turbine, a turbojet engine, and a turbofan engine.

In some embodiments, the thermochemical engine further comprises a liquid outlet. The liquid outlet can be fluidly connected to the reaction chamber (e.g., disposed therein) such that a liquid present in the reaction chamber can exit the reaction chamber via the liquid outlet. In some embodiments, the liquid outlet can be closed with a controllable valve. The controllable valve closing the liquid outlet can be controlled independently of any other valves present, such as those closing the ammonium source inlet, the nitrite source inlet, and gas outlet as described above. In some embodiments, the gas-driven energy transducer is also driven by the liquid. For example, the liquid can drive the gas-driven energy transducer in addition to the gas as the liquid exits the reaction chamber via the liquid outlet, the gas outlet, or both.

In an exemplary embodiment included for illustrative purposes, the reaction chamber can be a cylindrical chamber having the nitrite source inlet, ammonium source inlet, and liquid outlet disposed at a first end of the cylindrical chamber. At the second end of the cylindrical chamber, opposite the first end, the gas outlet can be disposed. The gas-driven energy transducer can be a piston configured to create a gas-tight seal with walls of the cylindrical chamber and slide along a length of the cylindrical chamber such that a volume of the reaction chamber can be defined by the wall of the cylindrical chamber and a surface of the piston. During operation, the piston can start in a first position such that the reaction chamber includes the nitrite source inlet and ammonium source inlet and a relatively small volume but does not include the gas outlet. After introduction of the nitrite source and ammonium source and caused by a reaction therebetween, production and expansion of gas associated with the reaction can push the piston along the length of the cylindrical chamber until the piston reaches a second position at which the reaction chamber includes the gas outlet. At this point, gas can exit the reaction chamber. The reaction chamber can be oriented such that no liquid present in the reaction chamber exits via the gas outlet at this time. A valve closing the liquid outlet up until this time can then be opened to allow any liquid present in the reaction chamber to exit via the liquid outlet.

In an exemplary embodiment included for illustrative purposes, the reaction chamber can be a cylindrical chamber having the nitrite source inlet and ammonium source inlet disposed at a first end of the cylindrical chamber. At the second end of the cylindrical chamber, opposite the first end, the gas outlet can be disposed. The gas-driven energy transducer can be a turbine disposed within the cylindrical chamber between the first end and the second end and configured such that after introduction of the nitrite source and ammonium source and caused by a reaction therebetween, production and expansion of gas associated with the reaction can turn the turbine as the gas exits via the gas outlet. The liquid outlet can be disposed in another portion of the second end of the cylindrical chamber. For example, the gas outlet can be oriented at a top of the second end of the cylindrical chamber and the liquid outlet can be oriented at a bottom of the second end of the cylindrical chamber. Such a configuration can prevent or minimize an amount of liquid exiting the cylindrical chamber via the gas outlet. In such a configuration, the liquid flowing to and exiting the reaction chamber via the liquid outlet can also turn the turbine.

In some embodiments, the thermochemical engine does not include a separate liquid outlet. In such embodiments, any liquid present in the reaction chamber can exit the reaction chamber via the gas outlet. In such an embodiment, the gas outlet can be referred to or function as a combined gas and liquid outlet.

In some embodiments, the gas outlet includes a vapor-liquid separator. The vapor-liquid separator can be any suitable separator known to one of ordinary skill in the art. For example, the vapor-liquid separator can include a feed inlet connected to the gas outlet of the reaction chamber. The vapor-liquid separator can also include a separation chamber configured to receive a stream of gas and liquid from the gas outlet. The separation chamber can allow the gas and liquid to separate, for example, under the influence of gravity. The separated gas can exit the separation chamber by a separate vapor outlet. The separated liquid can exit the separation chamber by a separate liquid outlet. In some embodiments, the separation chamber is configured to separate the gas and liquid by a force other than gravity. In some embodiments, the separation chamber is configured to separate the gas and liquid using a centrifugal effect. The centrifugal effect can be provided by rotation of the vapor-liquid separator or a portion thereof and/or can be provided by a cyclonic effect produced by a flow of a gas/liquid mixture. Such a separator can be referred to as a "rotational separator" or a "cyclonic separator" as appropriate. In some embodiments, the vapor liquid separator includes a pre-rotational element having an entry portion and a transition portion. The entry portion can have the feed inlet configured to receive a stream of gas and liquid from the gas outlet. The entry portion can also include a curvilinear conduit. In some embodiments, the vapor-liquid separator can include a controlled cyclonic section having an inlet adjoined to the pre-rotational element through convergence of the curvilinear conduit and the cyclonic section and a riser section at an upper end of the cyclonic member through the vapor outlet of the vapor-liquid separator through which gas passes to exit the vapor-liquid separator. Such a separator can operate based on a combination of phenomena including conversion of the linear velocity of the incoming gas/liquid mixture into a rotational velocity in the pre-rotation section, a controlled centrifugal effect to pre-separate the gas from liquid, and a cyclonic effect to promote separation of gas from the liquid.

In some embodiments, the gas outlet includes a hydrophobic element configured to prevent water from exiting via the gas outlet. In some embodiments, the hydrophobic element is disposed at an interface between the gas outlet and the reaction chamber. Locating the hydrophobic element at the interface between the gas outlet and the reaction chamber may be advantageous for preventing water or other hydrophilic liquid from entering the gas outlet. In some embodiments, the hydrophobic element is disposed within the gas outlet. Locating the hydrophobic element within the gas outlet may be advantageous for preventing water or other hydrophilic liquid from exiting the gas outlet. In some embodiments, the hydrophobic element can be disposed within the separation chamber of the vapor-liquid separator.

In general, the hydrophobic element can be in any suitable form or configuration. In general, the hydrophobic element can be hydrophobic due to the material from which the hydrophobic element is constructed or coated or can be hydrophobic due to surface features of a surface configured to contact the water. For example, the hydrophobic material can be formed from or coated with a naturally hydrophobic substance such as a wax, oil, fatty acid, grease, silicone, or hydrophobic polymer such as an acrylic polymer, an ether polymer, a fluorocarbon polymer, a polyolefin polymer, poly(vinyl chloride), and polyvinylpyrrolidone (PVP). In some embodiments, the naturally hydrophobic substance can be coated onto a support material such as particles, beads, a mesh, a membrane, or a combination of these. In some embodiments, the hydrophobic element includes a mesh. In some embodiments, the hydrophobic element includes a membrane.

In general, the thermochemical engine can include any number of reaction chambers. In some embodiments, the thermochemical engine includes one reaction chamber. In some embodiments, the thermochemical engine includes a plurality of reaction chambers. The thermochemical engine can include, for example, two, three, four, five, six, seven, eight, nine, ten, eleven, twelve, thirteen fourteen, fifteen, sixteen, or more reaction chambers. In embodiments having more than one reaction chamber, the reaction chambers can be arranged or oriented in any suitable orientation, layout, or arrangement.

In some embodiments, the reaction chambers can be arranged in a linear array. Such a linear array can be referred to as a "straight" or "inline" arrangement or engine. This opposing configuration can be particularly suited to embodiments in which the gas-driven energy transducer is a piston. For example, when the thermochemical engine includes four reaction chambers having gas-driven pistons, the configuration can be referred to as a "straight-four" or "inline-four". It should be understood that such a configuration is compatible with any number of reaction chambers.

In some embodiments, the reaction chambers can be arranged in an opposing configuration in which a reaction chamber is arrange directly opposite to another reaction chamber and having an opposite orientation. This opposing configuration can be particularly suited to embodiments in which the gas-driven energy transducer is a piston and/or in which there are an even number of reaction chambers. Such a configuration can be referred to as "horizontally opposed" or "flat". For example, when the thermochemical engine includes six reaction chambers having gas-driven pistons, the configuration can be referred to as a "flat-six", "horizontally opposed-six", or "boxer six". It should be understood that such a configuration is compatible with any number of reaction chambers.

In some embodiments, the reaction chambers can be arranged in a pair of banks oriented at an angle to each other. Such a layout can cause the banks form a "V" shape when viewed from the front of the engine. This angled configuration can be particularly suited to embodiments in which the gas-driven energy transducer is a piston and/or in which there are an even number of reaction chambers. Such a configuration can be referred to as a "V" or "Vee" configuration. For example, when the thermochemical engine includes six reaction chambers having gas-driven pistons, the configuration can be referred to as a "V6" configuration.

In some embodiments, the reaction chambers can be arranged in four of banks oriented about a common center. Such a layout can cause the banks form an "X" shape when viewed from the front of the engine. This angled configuration can be particularly suited to embodiments in which the gas-driven energy transducer is a piston and/or in which there are a number of reaction chambers that is divisible by four. Such a configuration can be referred to as an "X" configuration or "X engine"

In some embodiments, the reaction chambers can be arranged in a radial array. The radial array can include the reaction chambers oriented about a common center and facing radially outward from that common center. Such a configuration can be referred to as a "radial" configuration or "radial engine"

In some embodiments, the gas-driven energy transducer is coupled to an object. Such a coupling may afford a way of imparting motion and/or energy to the object. Such a coupling may allow the object to perform mechanical work. In general, the object coupled to the gas-driven energy transducer can be any suitable object. In some embodiments, the object is a crankshaft. Such crankshafts may be familiar to artisans skilled in the art of designing and building various types of engines. A crankshaft may be particularly advantageous to include in embodiments which include multiple reaction chambers. In such embodiments, the multiple reaction chambers may be oriented so as to allow the gas-driven energy transducer associated with each reaction chamber to be coupled to a single crankshaft. Such a configuration can allow the crankshaft to be driven by each of the gas-driven energy transducers.

In some embodiments, the crankshaft can also be used to drive or move the gas-driven energy transducer when the gas-driven energy transducer is not being driven or moved by gas related to the reaction between the nitrite source and the ammonium source. Such moving or driving of the gas-driven energy transducer can be useful for "resetting" the gas-driven energy transducer after the reaction between the nitrite source and the ammonium source such that the thermochemical engine is in a position, orientation, or configuration to have the reaction between the nitrite source and the ammonium source occur again and have the gas-driven energy transducer driven by the reaction. This may be referred to as a "cycle". Such a configuration may be particularly advantageous when the gas-driven energy transducer is a piston.

In general, the cycle can include any number of motions of the gas-driven energy transducer. In some embodiments, the gas-driven energy transducer is a piston, and the cycle includes one motion of the piston in which the reaction chamber volume increases as the gas drives the piston ("down" movement or "downstroke") and one motion of the piston in which the reaction chamber volume decreases the position of the piston is reset ("up" movement or "upstroke"). Such a cycle can be referred to as a "two-stroke" cycle or a "two-stroke" engine. In some embodiments, the gas-driven energy transducer is a piston, and the cycle includes two down movements (downstrokes) and two up movements (upstrokes). Such a cycle can be referred to as a "four-stroke" cycle or a "four-stroke" engine. In such a configuration, a first downstroke can be driven by the gas associated with the reaction between the nitrite source and the ammonium source. A first upstroke can be associated with clearing from the reaction chamber gas and/or liquid to "reset" the reaction chamber. A second downstroke can be associated with a "wash" or "rinse" of the reaction chamber, for example, with water as described below. A second upstroke can be associated with clearing the "wash" or "rinse" fluid from the reaction chamber. Such a cycle can be advantageous for maintaining the reaction chamber free of byproducts of the reaction between the nitrite source and the ammonium source.

In some embodiments, the object coupled to the gas-driven energy transducer can be used to provide the energy or motion for the upstroke. For example, a crankshaft can be used to both harness the power or energy of the reaction of the nitrite source and ammonium source on the downstroke and to provide motion to the piston on the upstroke, such as by inertia or receiving power or energy from another source, such as another reaction chamber. The other reaction chamber can be coupled to the same object (e.g., crankshaft) to provide such power or energy.

In some embodiments, the reaction chamber further comprises a water inlet. The water inlet may be advantageous for introducing into the reaction camber water. Water may be necessary for the reaction between the nitrite source and the ammonium source. In some embodiments, the reaction chamber does not have a separate water inlet. In some embodiments, the water necessary for the reaction between the nitrite source and the ammonium source is provided in the nitrite source and/or the ammonium source.

In some embodiments, the reaction chamber further comprises a wash inlet. The wash inlet may be advantageous for introducing into the reaction chamber a wash fluid. The wash fluid may be a gas and/or liquid. The wash fluid may be advantageous for washing or rinsing the reaction chamber to remove byproducts of the reaction between the nitrite source and the ammonium source. For example, water may be used as the wash fluid to remove counterions present in the nitrite source and/or the ammonium source. In some embodiments, the wash solution is water. In some embodiments, the byproducts of the reaction between the nitrite source and the ammonium source include a byproduct salt. In some embodiments, the byproduct salt is an alkali metal halide salt. In some embodiments, the byproduct salt is sodium chloride. The use of a wash fluid may be advantageous for reducing and/or preventing fouling, blocking, corrosion, or other undesirable process associated with damage to or reduction of efficiency of the thermochemical engine.

In some embodiments, the reaction chamber further comprises a wash outlet. The wash outlet may be advantageous for removing from the reaction chamber the wash fluid. In some embodiments, the reaction chamber does not include a wash outlet. In such embodiments, the wash fluid can exit the reaction chamber via the gas outlet and/or liquid outlet as appropriate.

In some embodiments, the reaction chamber includes a heater. The heater may be advantageous for increasing the temperature of the reaction chamber. Such an increase in the temperature may be advantageous and/or necessary for initiating and/or sustaining a reaction between the nitrite source and the ammonium source. In some embodiments, the heater is used to provide an initial increase in temperature. The initial increase in temperature can be used to initiate the reaction between the nitrite source and the ammonium source. Following the initiation of the reaction, heat generated by the reaction can be used to maintain the temperature of the thermochemical engine. In such a case, the heater can be turned off or its use discontinued. In some embodiments, the heater is not turned off or its use discontinued. In general, the heater can be any suitable heater known to one of ordinary skill in the art. Examples of such heaters include, but are not limited to, resistive heaters and heat exchangers.

In some embodiments, the reaction chamber includes a cooler. The cooler may be advantageous for decreasing the temperature of the reaction chamber. Such a decrease in the temperature may be advantageous and/or necessary for maintaining efficiency of a reaction between the nitrite source and the ammonium source and/or for ensuring safety during operation of the thermochemical engine. In general, the cooler can be any suitable cooler known to one of ordinary skill in the art. Example of such coolers include, but are not limited to, thermoelectric coolers, heat exchangers, heat sinks, and the like. In some embodiments, the cooling is provided by the wash fluid.

In some embodiments, the thermochemical engine includes a nitrite source reservoir. The nitrite source reservoir can be configured to be connect to the nitrite source inlet of the reaction chamber. The nitrite source can be provided to the reaction chamber from the nitrite source reservoir. In some embodiments, the nitrite source reservoir includes a heater. The nitrite source reservoir heater can be used to increase the temperature of the nitrite source being provided to the reaction chamber. Such an increase in the temperature may be advantageous and/or necessary for initiating and/or sustaining a reaction between the nitrite source and the ammonium source.

In some embodiments, the thermochemical engine includes an ammonium source reservoir. The ammonium source reservoir can be configured to be connect to the ammonium source inlet of the reaction chamber. The ammonium source can be provided to the reaction chamber from the ammonium source reservoir. In some embodiments, the ammonium source reservoir includes a heater. The ammonium source reservoir heater can be used to increase the temperature of the ammonium source being provided to the reaction chamber. Such an increase in the temperature may be advantageous and/or necessary for initiating and/or sustaining a reaction between the nitrite source and the ammonium source.

In some embodiments, the thermochemical engine includes a water reservoir. The water reservoir can be configured to be connect to the water inlet of the reaction chamber. The water can be provided to the reaction chamber from the water reservoir. In some embodiments, the water reservoir includes a heater. The water reservoir heater can be used to increase the temperature of the water being provided to the reaction chamber. Such an increase in the temperature may be advantageous and/or necessary for initiating and/or sustaining a reaction between the nitrite source and the ammonium source.

In some embodiments, the thermochemical engine includes a wash fluid reservoir. The wash fluid reservoir can be configured to be connect to the wash fluid inlet of the reaction chamber. The wash fluid can be provided to the reaction chamber from the wash fluid reservoir.

In some embodiments, the nitrite source and ammonium source are reacted in the presence of water at a reaction temperature of 50 to 150° C., preferably 55 to 125° C., preferably 60 to 100° C., preferably 65 to 90° C., preferably 70 to 80° C., preferably 72.5 to 77.5° C., preferably about 75° C.

In general, the nitrite source can be any substance that includes a nitrite ion. In some embodiments, the nitrite source is a nitrite salt. As used herein, the term "nitrite salt" refers to any salt that includes the nitrite anion. A nitrite salt can include any suitable cation, such as an alkali metal cation, an alkaline earth metal cation, a transition metal cation, a phosphonium cation, an organoammonium cation, a sulfonium cation, an imidazolium cation, and mixtures of these. In some embodiments, the nitrite salt is substantially free of an ammonium cation. In some embodiments, the nitrite salt is substantially free of an organoammonium cation. In some embodiments, the nitrite source comprises an alkali metal nitrite. Example of alkali metal nitrites include, but are not limited to lithium nitrite, sodium nitrite, potassium nitrite, rubidium nitrite, and cesium nitrite. In some embodiments, the alkali metal nitrite is sodium nitrite.

In general, the ammonium source can be any substance that includes an ammonium ion. In some embodiments, the ammonium source is an ammonium salt. As used herein, the term "ammonium salt" refers to any salt that includes the ammonium cation. In some embodiments, the ammonium source can be an organoammonium salt. It should be understood that the term "ammonium source" can refer to a source of an ammonium cation and/or an organoammonium cation. In some embodiments, the ammonium source is substantially free of an organoammonium cation. An ammonium or organoammonium salt can include any suitable anion, such as a halide anion, an acetate anion, a tosylate anion, a sulfate anion, an organosulfate anion such as methanesulfonate or alkylsulfate anion, a borate, organoborate, or fluorinated borate anion, a phosphate anion or organophosphate anion, a cyanide anion, a nitrite anion, and mixtures of these. In some embodiments, the ammonium source comprises an ammonium halide. Examples of ammonium halides include, but are not limited to ammonium fluoride, ammonium chloride, ammonium bromide, and ammonium iodide. In some embodiments, the ammonium halide is ammonium chloride. In some embodiments, the ammonium source comprises ammonium sulfate.

In general, the nitrite source can be provided to the reaction chamber in any suitable form. In some embodiments, the nitrite source is provided to the reaction chamber in form of a solution. Such a solution can include a solvent. In general, the solvent can be any suitable solvent known to one of ordinary skill in the art. Examples of suitable solvents include, but are not limited to water, alcohols such as methanol, ethanol, n-propanol, 2-propanol (also known as isopropanol), ethylene glycol, diethylene glycol, and glycerol; hydrocarbons such as pentane, hexane, and heptane; ketones such as acetone and methyl ethyl ketone; esters such as ethyl acetate; amides such as dimethylformamide; ethers such as tetrahydrofuran, diglyme, and diethyl ether; nitriles such as acetonitrile; halogenated organic solvents such as methylene chloride (also known as dichloromethane), carbon tetrachloride, and chloroform; aromatic organic solvents such as benzene and xylene; amines such as trimethylamine and pyridine; and mixtures thereof. In some embodiments, the solvent is water. In some embodiments, the nitrite source is an aqueous solution comprising a nitrite source as described above. In some embodiments, the aqueous solution comprising a nitrite source has a nitrite concentration of 0.25 to 5 M, preferably 0.5 to 4 M, preferably 0.75 to 3.5 M, preferably 1 to 3 M of nitrite ion. For example, the aqueous solution comprising a nitrite source can have a nitrite concentration of 0.25 M, 0.5 M, 0.75 M, 0.9 M, 1.0 M, 1.25 M, 1.5 M, 1.75 M, 2.0 M, 2.25 M, 2.5 M, 2.75 M, 3.0 M, 3.25 M, 3.5 M, 3.75 M, 4.0 M, 4.25 M, 4.5 M, 4.75 M, or 5.0 M.

In general, the ammonium source can be provided to the reaction chamber in any suitable form. In some embodiments, the ammonium source is provided to the reaction chamber in form of a solution. Such a solution can include a solvent as described above. In some embodiments, the ammonium source is an aqueous solution comprising an ammonium source as described above. In some embodiments, the aqueous solution comprising an ammonium source has an ammonium concentration of 0.25 to 5 M, preferably 0.5 to 4 M, preferably 0.75 to 3.5 M, preferably 1 to 3 M of ammonium ion. For example, the aqueous solution comprising an ammonium source can have an ammonium concentration of 0.25 M, 0.5 M, 0.75 M, 0.9 M, 1.0 M, 1.25 M, 1.5 M, 1.75 M, 2.0 M, 2.25 M, 2.5 M, 2.75 M, 3.0 M, 3.25 M, 3.5 M, 3.75 M, 4.0 M, 4.25 M, 4.5 M, 4.75 M, or 5.0 M.

Providing one or both of the nitrite source and ammonium source as an aqueous solution may be advantageous for ensuring that any byproducts of the reaction therebetween can be removed. Such removal may obviate or reduce the need for a separate washing or rinsing step or any parameter thereof, such as a wash fluid volume or wash frequency.

In some embodiments, one or both of the nitrite source and the ammonium source are provided as an aerosol. In some embodiments, the aerosol comprises droplets of a liquid comprising the ammonium source and/or the nitrite source. For example, the nitrite source can be provided as an aerosol comprising droplets of a liquid comprising the nitrite source. In some embodiments, the liquid comprising the nitrite source is an aqueous solution comprising the nitrite source as described above. In some embodiments, the liquid comprising the ammonium source is an aqueous solution comprising the ammonium source as described above. In some embodiments, the liquid comprising the nitrite source is a suspension or dispersion of solid particles of the nitrite source. In some embodiments, the liquid comprising the ammonium source is a suspension or dispersion of solid particles of the ammonium source as described above. In some embodiments, the aerosol comprises solid particles of the ammonium source and/or the nitrite source.

In some embodiments, the thermochemical engine produces 150,000 to 1,250,000 psi*mL, preferably 155,000 to 1,200,000 psi*mL, preferably 160,000 to 1,150,000 psi*mL, preferably 165,000 to 1,100,000 psi*mL, preferably 170 to 1,050,000 psi*mL, preferably 175,000 to 1,000,000 psi*mL, preferably 180,000 to 975,000 psi*mL, preferably 185,000 to 950,000 psi*mL, preferably 188,000 to 949,500 psi*mL per mole of nitrite ion reacted.

The present disclosure also relates to a method of providing kinetic energy to an object. The method involves coupling the object to the gas-driven energy transducer, and providing to the reaction chamber the nitrite source, the ammonium source, and water. Upon providing these, the nitrite ion and the ammonium ion undergo a chemical reaction to produce a gas and heat which drive the gas-driven energy transducer.

In general, the object coupled to the gas-driven energy transducer can be any suitable object as described above. For example, the object can be a crankshaft, a swashplate, a connecting rod, a beam, a cam, a rhombic drive, and combinations of these. The object can include a linkage suitable for transferring linear motion (e.g., motion of a piston) to rotary motion (e.g., motion of a crankshaft or turbine) and vice-versa. The thermochemical engine can be used to perform mechanical work on or via the object.

In general, the kinetic energy can be provided on a continuous basis or an intermittent (e.g., cyclic or one-time) basis. For example, when the gas-driven energy transducer is a turbine, the nitrite source and ammonium source can be provided to the reaction chamber continuously. Such continuous providing of the nitrite source and ammonium source can result in a continuous production of gas. Such a continuous production of gas can provide continuous motion to the turbine. When the gas-driven energy transducer is a piston, the nitrite source and ammonium source can be provided to the reaction chamber intermittently. For example, the nitrite source and ammonium source can be provided to the reaction chamber in cycles as described above.

In some embodiments, the method further includes rinsing or washing the reaction chamber with a wash fluid. The rinsing or washing may be advantageous for washing or rinsing the reaction chamber to remove byproducts of the reaction between the nitrite source and the ammonium source. For example, water may be used as the wash fluid to remove counterions present in the nitrite source and/or the ammonium source, as described above. In some embodiments, the wash solution is water, as described above. The rinsing or washing can involve providing to the reaction chamber the wash fluid, then draining the wash fluid from the reaction chamber. In general, the rinsing or washing of the reaction chamber can be performed after the reaction between the nitrite source and the ammonium source. When the nitrite source and ammonium source are provided to the reaction chamber continuously, the rinsing or washing can be performed at any time. The introduction of the ammonium source and/or nitrite source into the reaction chamber can be stopped or paused, then the wash fluid can be introduced into the reaction chamber. Following the rinsing or washing, the in introduction of the ammonium source and/or nitrite source into the reaction chamber can be resumed. When the nitrite source and ammonium source are provided to the reaction chamber continuously, such as in an embodiment where the gas-driven energy transducer is a piston and the thermochemical engine is configured to operate in cycles, the rinsing or washing can be performed as a separate activity in between cycles. In general, the rinsing or washing can be performed after any suitable number of cycles. In some embodiments, the rinsing or washing is performed after every cycle. In some embodiments, the rinsing or washing is performed after every 2 cycles, or every 3 cycles, or every 4 cycles, or every 5 cycles, or every 6 cycles, or every 7 cycles, or every 8 cycles, or every 9 cycles, or every 10 cycles, or every 15 cycles, or every 20 cycles, or every 25 cycles as appropriate.

In some embodiments, the nitrite source and ammonium source are reacted in the presence of water at a reaction temperature of 50 to 150° C., preferably 55 to 125° C., preferably 60 to 100° C., preferably 65 to 90° C., preferably 70 to 80° C., preferably 72.5 to 77.5° C., preferably about 75° C., as described above.

In some embodiments, the nitrite source is provided at a rate of 0.25 to 2.5 mol/min, preferably 0.5 to 2.0 mol/min, preferably 0.75 to 1.75 mol/min, preferably 0.8 to 1.5 mol/min preferably 0.9 to 1.25 mol/min, preferably 1.0 to 1.1 mol/min. In some embodiments, the ammonium source is provided at a rate of 0.25 to 2.5 mol/min, preferably 0.5 to 2.0 mol/min, preferably 0.75 to 1.75 mol/min, preferably 0.8 to 1.5 mol/min preferably 0.9 to 1.25 mol/min, preferably 1.0 to 1.1 mol/min. In some embodiments, the ammonium source is provided at a rate of 0.25 to 2.5 mol/min, preferably 0.5 to 2.0 mol/min, preferably 0.75 to 1.75 mol/min, preferably 0.8 to 1.5 mol/min preferably 0.9 to 1.25 mol/min, preferably 1.0 to 1.1 mol/min. In some embodiments, the ammonium source is provided at a rate of 0.25 to 2.5 mol/min, preferably 0.5 to 2.0 mol/min, preferably 0.75 to 1.75 mol/min, preferably 0.8 to 1.5 mol/min preferably 0.9 to 1.25 mol/min, preferably 1.0 to 1.1 mol/min. In some embodiments, the nitrite source and ammonium source are provided at rates having a ratio of 4.0:1 to 1:4.0, preferably 3.5:1 to 1:3.5, preferably 3.0:1 to 1:3.0, preferably 2.5:1 to 1:2.5, preferably 2.0:1 to 1:2.0, preferably 1.75:1 to 1:1.75, preferably 1.5:1 to 1:1.5, preferably 1.25:1 to 1:1.25, preferably 1.1:1 to 1:1.1, preferably 1:1.

In some embodiments, the nitrite source and ammonium source are provided in amounts to give a mole ratio of nitrite ion to ammonium ion in the reaction chamber of 0.75:1 to 1:0.75, preferably 0.80:1 to 1:0.80, preferably 0.85:1 to 1:0.85, preferably 0.90:1 to 1:0.90, preferably 0.925:1 to 1:0.925, preferably 0.95:1 to 1:0.95, preferably 0.975:1 to 1:0.975, preferably 0.99:1 to 1:0.99, preferably 1:1. The mole ratio can be adjusted by providing different amounts of the ammonium source and/or nitrite source, providing different concentrations of the ammonium source and/or nitrite source, providing different rates of providing the ammonium source and/or nitrite source, or a combination of these.

In some embodiments, the chemical reaction between the nitrite ion and the ammonium ion reaches 70 to 90% completion in 10 to 15 minutes. In some embodiments, the chemical reaction between the nitrite ion and the ammonium ion reaches 77.5 to 87.5%, preferably 80 to 85%, preferably 81 to 84%, preferably 82 to 83% completion in 10 to 15 minutes. In some embodiments, the chemical reaction between the nitrite ion and the ammonium ion reaches 70 to 90% completion in 11 to 14 minutes, preferably 12 to 13 minutes.

The examples below are intended to further illustrate protocols for constructing and/or operating the thermochemical engine of the present disclosure and are not intended to limit the scope of the claims.

Where a numerical limit or range is stated herein, the endpoints are included. Also, all values and subranges within a numerical limit or range are specifically included as if explicitly written out.

Numerous modifications and variations of the present invention are possible in light of the above teachings. It is therefore to be understood that, within the scope of the appended claims, the invention may be practiced otherwise than as specifically described herein.

EXAMPLES

Fused chemical reactions, characterized by undergoing a delay before producing considerable amounts of products are created in an exothermic fashion, have been used before to provide heat in situ for the dissolution of organic depositions like waxes, asphaltenes, and hydrates in pipelines or for reservoir stimulation. The reaction between ammonium chloride ($NH_4Cl$) and sodium nitrite ($NaNO_2$) can be referred as chemistry 1 and is a highly exothermic ($\Delta H_{Rx}=-79.95$ kcal $mol^{-1}$, irreversible ($K_{eq}=3:9\times1071$ Pa×mole $m^{-3}$ at 25° C.) and controllable reactions i.e., Equation (1) as an overall reaction scheme and Equations 2 and 3 as the stepwise reaction scheme.

As a result, this reaction (chemistry 1) can be used in a class of systems called fused chemical reactions:

$$NH_4Cl(aq)+NaNO_2(aq)\rightarrow NaCl(aq)+2H_2O(l)+N_2(g) \qquad (1)$$

$$NH_4Cl(aq)+NaNO_2(aq)\rightarrow NH_4NO_2(aq)+NaCl(aq) \qquad (2)$$

$$NH_4NO_2(aq)\rightarrow 2H_2O(l)+N_2(g) \qquad (3)$$

A numerical framework was developed and implemented to track the reaction throughout the phase space allowing to investigate viable pathways for the reaction scheme to become self-sustaining and maximize extractable work.

Figure 1A:
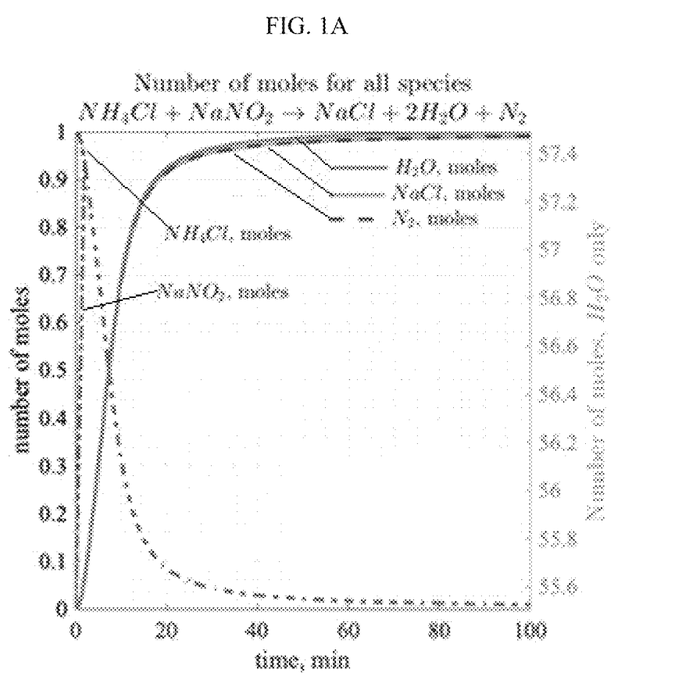
FIG. 1A shows a plot of the stoichiometry of components of the thermochemical reaction under standard conditions for Chemistry 1.

Concentration profiles of two chemistry cases i.e., for $NH_4Cl$ and $(NH_4)_2SO_4$ as shown in FIG. 1, where 1 mole of each is considered while 20° C. and 1 atm were considered to mimic start up condition which will change in later cycles. $NaNO_2$ is added at a feed rate of 1.0 mol/min over a time period of 2 min to give a total of 2 mol $NaNO_2$ to react with 1 mol of $NH_4Cl$ and 1 mol of $(NH_4)_2SO_4$. The latter is added over the course of 2 minutes. $H_2O$ is plotted as total moles of water (see axis on the right). The reactor is filled with 1 L of water, equal to about 55.56 mol. As per the stoichiometry, 2 additional moles of water are produced.

Figure 1B:
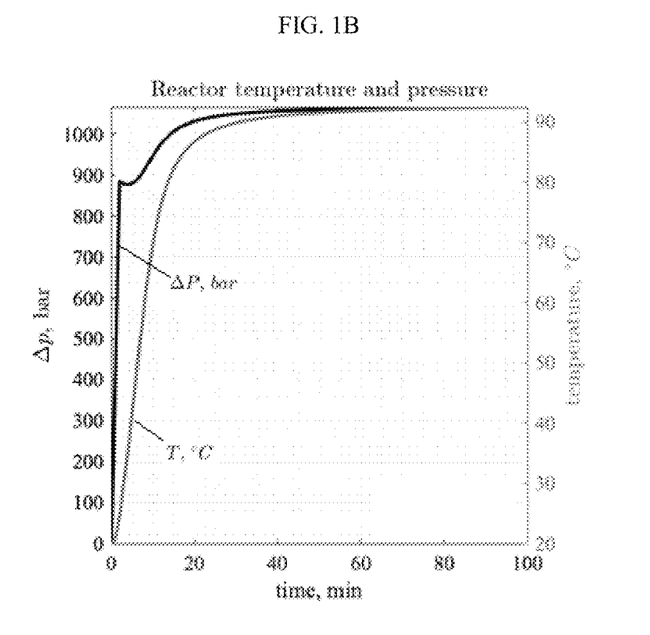
FIG. 1B shows a plot of the estimated reactor temperature and pressure for the thermochemical reaction under standard conditions for Chemistry 1.

The pressure is estimated using the Tumlirz-Tammann-Tait equation of state (TTT-EOS) in its pressure explicit form. This EOS is for pure water only but has the advantage that it just requires temperature. For chemistry 1, the change in pressure estimate of about 1370 bar. For the initial conditions, the model estimates a temperature change from 20° C. to about 109° C. for chemistry 1. As temperature goes into the exponent of the rate law, even small differences can make substantial change. Temperature (TCF+Condensate) and Temperature (TCF+heavy oil) are not good for comparison due to the assumingly different heat capacities of the fluids.

Figure 1C:
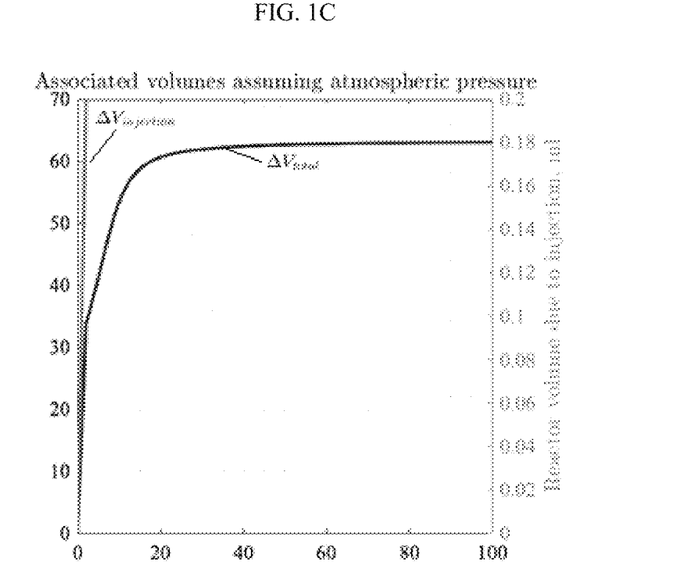
FIG. 1C shows a plot of the estimated volumes for the thermochemical reaction under standard conditions for Chemistry 1.

The plot below shows volumes changes due to the chemical reaction assuming an isobaric reactor, that is constant pressure at 1 atm. $\Delta V_{inj}$ is the volume of $NaNO_2$ added that is 0.2 ml. This volume change will enable a back of the envelope calculation for the pressure one can expect for an isochoric reactor.

Figure 2A:
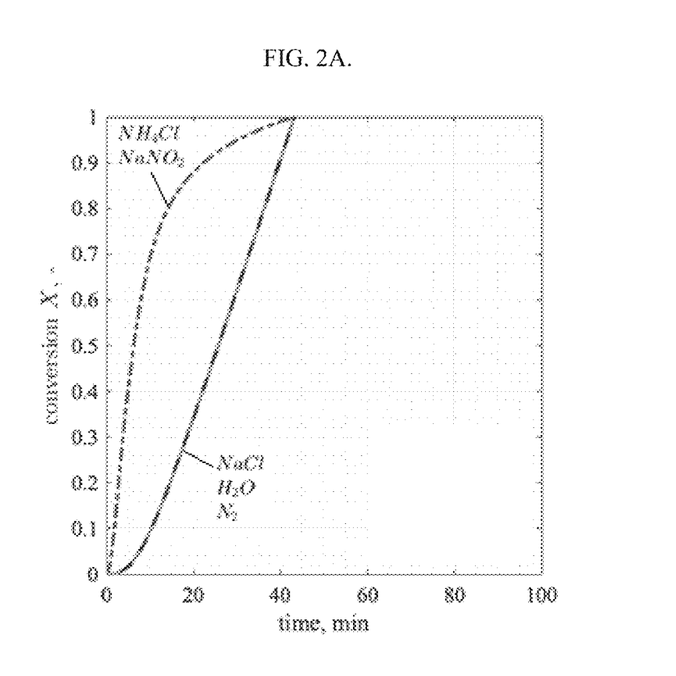
FIG. 2A shows a plot of the degree of conversion vs time under standard conditions for Chemistry 1 with full conversion being defined as when the second derivative of degree of conversion as a function of time is zero.
Figure 2B:
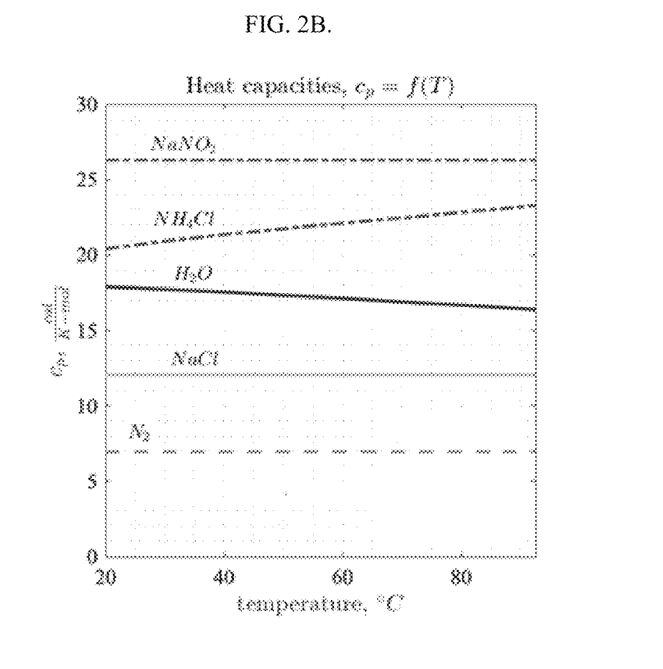
FIG. 2B shows a plot of heat capacity vs temperature for the various reactants and products for the thermochemical reaction under standard conditions for Chemistry 1.
Figure 2C:
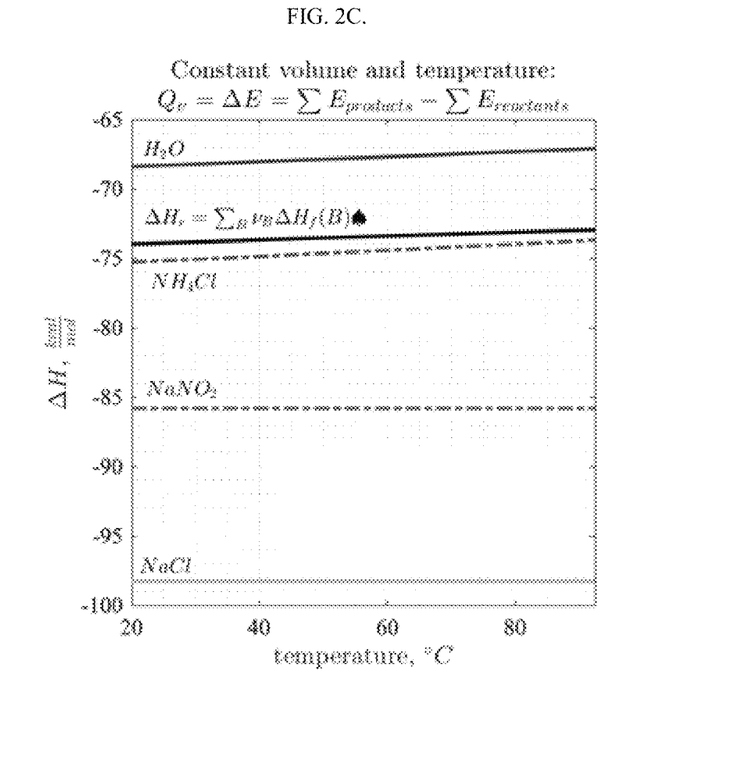
FIG. 2C shows a plot of the reaction enthalpy vs temperature for the various reactants and products for the thermochemical reaction under standard conditions for Chemistry 1.

FIG. 2A shows the degree of conversion vs time where $\chi=1$ implies that all reactants have been consumed and products have been created. FIG. 2B shows a plot of the estimated heat capacities, needed to calculate temperature increase. FIG. 2C shows a plot of the estimated reaction enthalpy, needed to calculate temperature increase. For all practical purposes in case of Chemistry 1, full conversion was at about 0.7 or 0.8. 80% of conversion $\chi$ is reached within 12 minutes but it takes another 41 minutes to reach $\chi \approx 1$ about 53 minutes into the process. Notably, experiments suggest $\chi=0.8$ at 800 s or 13.3 minutes, and $\chi \approx 1$ at about 1090 s or 18.2 minutes for similar initial conditions. Similarly, to Chemistry 1, a more pragmatic choice for full conversion seems to be $\chi=0.8$ or 0.9. Enforcing full conversion at $\chi=1$ is problematic due to the asymptotic behavior of the reaction and associated numerical difficulties.

It is important to note that $NaNO_2$ was added as a feed over the time of two minutes to mimic a working process. Including a heat loss model with the reactor and exploiting the products upon discharge of the reactor to warm it up and bring it to a higher operating temperature may allow a significant decrease in the time to reach full conversion, as illustrated by experiments with higher initial temperatures e.g., $T_{75}$. If mechanical work or power (Watt, J/s) is to be extracted from the process, it is advantageous to reach a high degree of conversion as quickly as possible.

Heat capacity, $c_p$, is a function of both temperature and pressure. The Shomate equation, used to estimate the respective $c_p$ values at constant reaction enthalpy. For Chemistry 1, $\Delta H_r^{\ominus}=-370$ kJ/mol$\approx-88.5$ kcal/mol. $\Delta H_r$ is, however, a function of, among other parameters, temperature. $\Delta H_r$ was estimated using its definition $\Delta H_r = \Sigma_B v_B \Delta H_f(B)$ where $v_B$ is the stoichiometric coefficient of species B and $\Delta H_f(B)$ is the enthalpy of formation of species B as a function of temperature estimated from the Shomate equation informed by the Shomate coefficients available from the U.S. National Institute of Standards and Technology (NIST). As can be seen in FIG. 2C, the temperature dependent reaction enthalpy is about $-74$ kcal/mol versus the provided value of $-88.5$ kcal/mol for Chemistry 1.

As shown in Equation (4) below, the reaction enthalpy is not only a function of temperature, but also the pressure. Thus, higher reactor temperatures are to be expected once the pressure dependency is accounted for.

$$\Delta H_{r,P,T} = \Delta H_r^{\ominus} + \int_1^P \left[\left(\frac{\partial H_{prod.}}{\partial p}\right)_T - \left(\frac{\partial H_{react.}}{\partial p}\right)_T\right]dp + \underbrace{\int_{298}^T \left[\left(\frac{\partial H_{prod.}}{\partial p}\right)_p - \left(\frac{\partial H_{react.}}{\partial p}\right)_p\right]dT}_{currenlty\ modeled} \quad (4)$$

One goal is to move the water into the supercritical region and subsequently perform an isothermal expansion. However, the Volume Translated Tangent of the Mean Spherical Radius version III (VTBMSR-III) equation of state frequently used in calculations has obvious challenges in for example, estimating liquid water densities. The most accurate data available is provided by the NIST Reference Fluid Thermodynamic and Transport Properties Database (REFPROP).

From a reaction enthalpy perspective, Chemistry 1 appears favorable with only $\Delta H_r^{\circ}=-370$ kJ/mol for Chemistry 1. However, for the reaction to take place, each reactant needs to be in the aquatic phase. For this to be the case, a certain amount of (pure) water is required. Hence, calculations made based on the 1 mol basis for both $NH_4Cl$ and $NaNO_2$ do not take into account the water used to deliver these species. Below are the calculations for water required for each species. Chemistry 1 has, in general, lower total amount of water requirements for the reaction to take place (21.30 mol), as shown in Table 1 below.

The maximum temperature increase achievable is 330 K for Chemistry 1. Though, for this case, the performance on a K/mol-$H_2O$ basis is still lower. Accordingly, minimizing the use of water is preferable. A pragmatic approach involves examining the economics ($/kg of the reactants) and the cleanup costs associated with the final product. Reactant species can be 5 injected taking solubility limitations into account.

TABLE 1

Total water requirement for NaCl to stay dissolved

| Species | Solubility (g/L) | Solubility (mol/L) | Solubility (mol/mol$_{H2O}$) | $H_2O$ Required (mol) | Excess when 21.30 mol $H_2O$ Supplied (mol) |
|---|---|---|---|---|---|
| $NH_4Cl$ | 383 | 7.16 | 0.13 | 7.75 | — |
| $NaNO_2$ | 844 | 12.23 | 0.22 | 4.54 | — |
| NaCl | 360 | 6.16 | 0.11 | 9.01 | 12.29 |

TABLE 2

| Species | H₂O Required (g) | H₂O Provided from Reaction (mol \| g) | H₂O Required for Full Conversion (mol \| g) | Heat Capacity (J/K) | Heat Released (kJ) | Increase in Water Temperature (K) | Increase in Water Temperature per mol (K/mol) |
|---|---|---|---|---|---|---|---|
| | | | Calculated Heat Increase | | | | |
| $NH_4Cl$ | 139.66 | — | — | — | — | | |
| $NaNO_2$ | 81.75 | — | — | — | — | | |
| NaCl | 0.0 | — | — | — | — | | |
| Total | 221.41 | 2 \| 36.03 | 14.29 \| 257.44 | 1122 | −370 | 330 | 23.08 |

The capability of the thermochemical reaction Chemistry 1 to generate pressure and use the pressure to drive the high-pressure cell's piston, simulating the operation of the steam engine was evaluated. Two thermochemical reactants that were evaluated as ammonium source and nitrite source, respectively: $NH_4Cl$ (A) and $NaNO_2$ (B). The utilized thermochemicals may be activated by heat or citric acid. The heat-triggered activation was selected since the addition of citric acid caused a spontaneous reaction and system corrosion. The heat activated reaction can be controlled and make useful for Steam engine power application. First, a total of 10 cases were considered that were comprised of a base case (with water only) and others for different molarities (1M, 2M, and 3M). For these experiments, a 250 mL volume transfer cell (16 cm cell diameter, 10 cm cap length and 33 cm cell length) equipped with a piston inside was used to investigate the produced pressure and temperature changes. The pressure builds up was observed using digital pressure transducer. A high-pressure liquid pump was connected from the bottom of the cell to remove the air from the lines and top of the cell after loading the thermochemical into it. The cell was heated using electric oven from Binder.

TABLE 3

Different cases on various combination of thermochemical in terms of molarity (A = $NH_4Cl$; B = $NaNO_2$).

| Sr. No. # | Case ID | Thermo-chemicals (molarity) | Solution volume (A-B), mL |
|---|---|---|---|
| 1 | A | Only water | — |
| 2 | B | Case-1 M | 20-20 |
| 3 | C | | 12-28 |
| 4 | D | | 28-12 |
| 5 | E | Case-2 M | 20-20 |
| 6 | F | | 12-28 |
| 7 | G | | 28-12 |
| 8 | H | Case-3 M | 20-20 |
| 9 | J | | 12-28 |
| 10 | K | | 28-12 |

Figure 3:
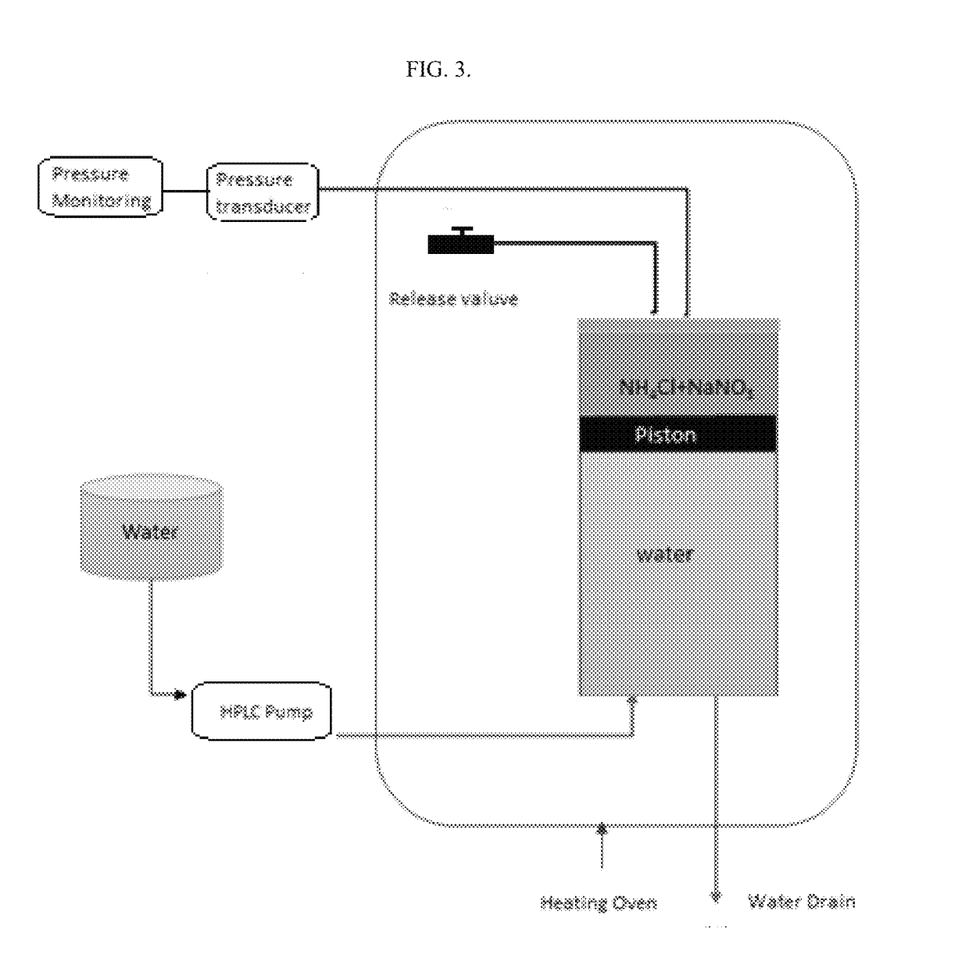
FIG. 3 shows a schematic depiction of the experimental setup used to perform the application of thermochemical to push the piston and water.

The thermochemical reactants were initially loaded into the HP cell and placed in the oven. High-pressure pump was used to increase the pressure slightly (10-15 psi gauge) from the bottom in order to remove entrapped air from the top of the cell and fill the lines with thermochemical reactants. Once the lines were entirely filled, the pressure was depleted until it reached atmospheric pressure. The cell was sealed and heated to 75° C. The oven was programmed to reach 75° C. within 10 to 15 minutes. After the oven reached 75° C., it was maintained for 5 to 10 minutes and then turned off. The pressure was monitored using a PC-connected with digital pressure transducer. The pressure increased with time and reached a plateau after several hours that varies according to the molarity of the utilized thermochemical. FIG. 3 illustrates the schematic setup described here.

Once the pressure stabilized and became constant, the bottom valve was opened to drain out the water. The water volume was collected in the flask during pressure depletion. The generated gas pushed the water out. At the end of depletion, the remaining pressure was depleted by removing the trapped gas from the top of the cell. The reaction gas was passed through water to avoid its harmful impact on the surroundings. It is worth noting that the reaction between $NH_4Cl$ (A) and $NaNO_2$ (B) generated nitrogen ($N_2$), water and salt (NaCl) as reaction products as stated in Equation 5. With the release of pressure, the final pressure approached the initial pressure. At the end of the test, the chemicals were removed from the cell, washed with soap and dried with acetone to make it ready for another test as mentioned in test plan (see Table 2).

$$NaNO_2 + NH_4Cl \xrightarrow{heating} N_2 + H_2O + NaCl \qquad (5)$$

The pressure inside the cell at the top portion starts to build up and its maximum value was noted just at the start of stabilization. Pressure as $P_{depleted}$ was read on the monitoring system after the withdrawal of water which was more than the initial pressure. The value of the depleted pressure is varying and was not consistent but depends on the maximum pressure obtained in the cell. After releasing the pressure from the bottom of the cell, the pressure then approached to the initial pressure in the system that was earlier noted to be approximately 3 psi.

Figure 4:
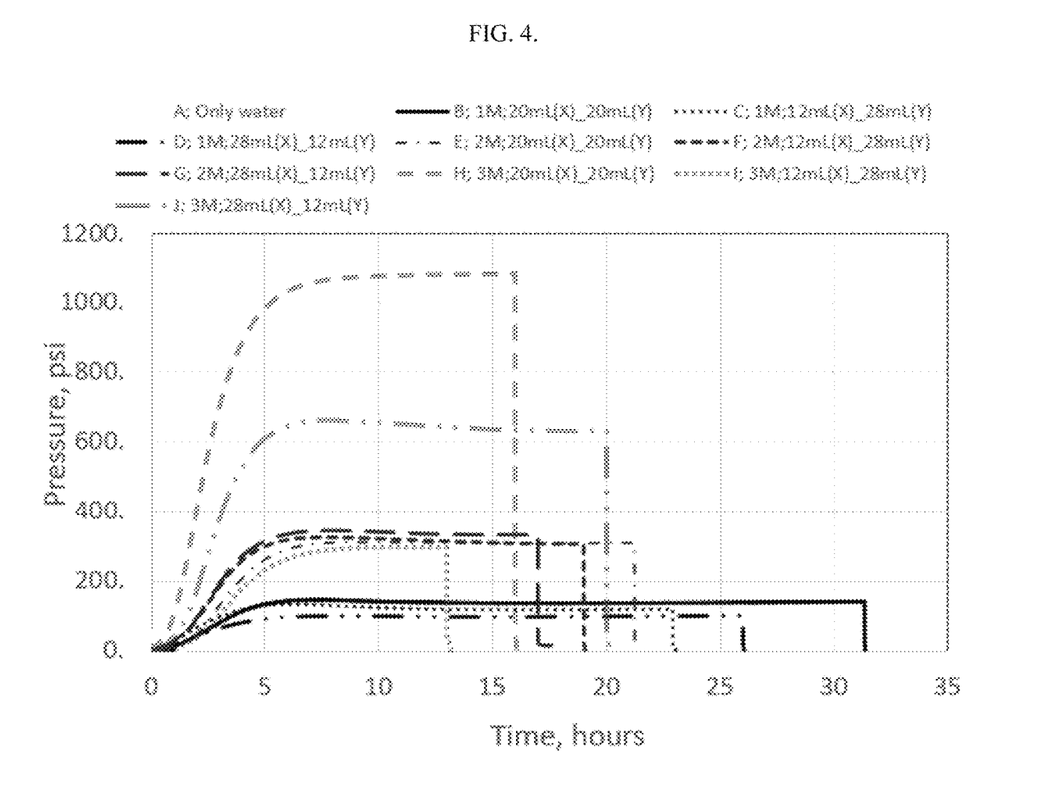
FIG. 4 shows a plot of the pressure vs time for various cases depicted in Table 3.

The results obtained indicated that a solution of high molarity (i.e., 3M) offers maximum pressure build-up, large water produced by the piston and large final pressure value compared to 1 M and 2M solutions and thus can be ranked as 3M>2M>1M. For 3 M solution of different combinations of $NH_4Cl$ and $NaNO_2$, pressure varies from 341 to 1085 psi, water produced in the range of 59 to 175 mL and depleted pressure from 20-26 psi. For 2 M solution of different combinations of $NH_4Cl$ and $NaNO_2$, the pressure lies in the range from 311 to 334 psi, water produced in the range of 42 to 58 mL and depleted pressure from 16 to 22 psi. For 1 M solution of different combinations of $NH_4Cl$ and $NaNO_2$, the pressure lies within the range of 100 to 171 psi, water produced in the range of 16 to 22 mL and depleted pressure from 12 to 14 psi as listed in Table 4 and plotted in FIG. 4. Commonly, 20 mL (A) and 20 mL (B) combination is outer performing than any other combinations of chemicals in terms of pressure build-up and water produced. In terms of pressure buildup performance, chemical combination can be ranked as 20-20>12-28>28-12, 28-12>12-28>20-20, 20-20>28-12>12-28 for 1M, 2M and 3M, respectively. On the other hand, the chemical combination can be ranked as 20-20>28-12>12-28 in terms of depleted pressure and pushing the piston to displace water) for all cases. Pressure stabilization time is found sensitive to molarities and combinations of chemicals. For instance, pressure stabilization was achieved between 10 to 20 hours for all cases.

Considering the ability of thermochemical reactants to build up pressure and push the piston downward for water withdrawal, more energy is needed and thus 3 M case with a combination of 20-20 is preferable to adopt. Here large volume of water produced by 3 M in 20-20 is attractive as different piston cells are generally connected by a crank shaft and water presence is mimicking that force that will be required to drive the piston of another cell piston and hence run the steam engine. In addition, a low-scale small engine and middle-size engine can adopt 1M and 2M solution, respectively.

TABLE 4

The obtained results on different cases on various combination of thermochemical in terms of molarity (A = $NH_4Cl$; B = $NaNO_2$).

| Sr. No. # | Case ID | Thermo-chemicals | Solution volume (A/B), mL | $P_{max}$, psi | $P_{Depleted}$ (water removal by piston push downward), psi | Water volume produced, mL |
|---|---|---|---|---|---|---|
| 1 | A | Only water | — | — | — | — |
| 2 | B | Case-1M | 20-20 | 171 | 14 | 22 |
| 3 | C | | 12-28 | 119 | 12 | 16 |
| 4 | D | | 28-12 | 100 | 13 | 21 |
| 5 | E | Case-2M | 20-20 | 311 | 22 | 58 |
| 6 | F | | 12-28 | 317 | 16 | 42 |
| 7 | G | | 28-12 | 334 | 17 | 54 |
| 8 | H | Case-3M | 20-20 | 1085 | 26 | 175 |
| 9 | J | | 12-28 | 341 | 20 | 59 |
| 10 | K | | 28-12 | 652 | 25 | 98 |

The invention claimed is:

1. A method of providing kinetic energy to an object, the method comprising
    coupling the object to a gas-driven energy transducer of a thermochemical engine that includes
        a reaction chamber comprising a nitrite source inlet, an ammonium source inlet, and a gas outlet, and
        a gas-driven energy transducer coupled to the reaction chamber such that a gas produced in the reaction chamber moves the gas-driven energy transducer in a process of exiting the reaction chamber via the gas outlet;
    providing to the reaction chamber a nitrite source comprising a nitrite ion and an ammonium source comprising an ammonium ion in the presence of water at a reaction temperature of 50 to 150° C.; and
    rinsing the reaction chamber by providing to the reaction chamber a wash fluid,
    wherein the nitrite ion and the ammonium ion undergo a chemical reaction to produce a gas and heat which drive the gas-driven energy transducer.

2. The method of claim 1, wherein the nitrite source comprises an alkali metal nitrite.

3. The method of claim 2, wherein the alkali metal nitrite is sodium nitrite.

4. The method of claim 1, wherein the ammonium source comprises an ammonium halide.

5. The method of claim 4, wherein the ammonium halide is ammonium chloride.

6. The method of claim 1, wherein the ammonium source comprises ammonium sulfate.

7. The method of claim 1, wherein the nitrite source is provided to the reaction chamber in form of an aqueous solution having a concentration of 0.25 to 5 M of nitrite ion.

8. The method of claim 1, wherein the ammonium source is provided to the reaction chamber in form of an aqueous solution having a concentration of 0.25 to 5 M of ammonium ion.

9. The method of claim 1, wherein the nitrite source and ammonium source are provided in amounts to give a ratio of nitrite ion to ammonium ion in the reaction chamber of 0.75:1 to 1:0.75.

10. The method of claim 1, wherein the nitrite source and the ammonium source are each provided as an aerosol.

11. The method of claim 1, wherein the nitrite source and the ammonium source are each provided as a liquid.

12. The method of claim 1, wherein the method produces 150,000 to 1,250,000 psi*mL per mole of nitrite ion reacted.

13. The method of claim 1, wherein the nitrite source and ammonium source are each provided at a rate of 0.25 to 2.5 mol/min.

14. The method of claim 1, wherein the chemical reaction between the nitrite ion and the ammonium ion reaches 70 to 90% completion in 10 to 15 minutes.

15. The method of claim 1, wherein the wash fluid is water.

* * * * *